United States Patent
K et al.

(10) Patent No.: US 11,163,781 B2
(45) Date of Patent: Nov. 2, 2021

(54) EXTENDED STORAGE OF TEXT ANALYSIS SOURCE TABLES

(71) Applicant: SAP SE, Walldorf (DE)

(72) Inventors: Naveen K, Bangalore (IN); Nidhi Prashant Augustine, Bangalore (IN)

(73) Assignee: SAP SE, Walldorf (DE)

( * ) Notice: Subject to any disclaimer, the term of this patent is extended or adjusted under 35 U.S.C. 154(b) by 282 days.

(21) Appl. No.: 16/246,716

(22) Filed: Jan. 14, 2019

(65) Prior Publication Data

US 2020/0226131 A1 Jul. 16, 2020

(51) Int. Cl.
*G06F 16/00* (2019.01)
*G06F 16/2458* (2019.01)
*G06F 16/22* (2019.01)

(52) U.S. Cl.
CPC ........ *G06F 16/2465* (2019.01); *G06F 16/221* (2019.01)

(58) Field of Classification Search
CPC . G06F 16/221; G06F 16/2465; G06F 16/2282
See application file for complete search history.

(56) References Cited

U.S. PATENT DOCUMENTS

| | | | | |
|---|---|---|---|---|
| 7,007,015 B1* | 2/2006 | Nayak | ................... | G06F 16/284 |
| 9,195,657 B2* | 11/2015 | Oks | ..................... | G06F 16/282 |
| 9,501,550 B2* | 11/2016 | Zhang | ................... | G06F 16/283 |
| 9,513,811 B2* | 12/2016 | Wein | ..................... | G06F 3/0685 |
| 9,891,831 B2* | 2/2018 | Legler | ................... | G06F 16/221 |
| 9,977,801 B2* | 5/2018 | Florendo | ................. | G06F 16/22 |
| 10,042,552 B2* | 8/2018 | Blanco | .................... | G06F 16/28 |
| 10,127,260 B2* | 11/2018 | Goel | ..................... | G06F 3/0619 |
| 10,235,377 B2* | 3/2019 | Mueller | .................... | G06F 16/17 |
| 10,678,788 B2* | 6/2020 | Macnicol | ................. | G06F 3/061 |
| 2008/0307386 A1* | 12/2008 | Chen | ..................... | G06Q 30/02 717/109 |
| 2012/0173589 A1* | 7/2012 | Kwon | ................. | G06F 16/2282 707/803 |
| 2013/0124193 A1* | 5/2013 | Holmberg | ............. | G06F 40/131 704/9 |
| 2013/0124545 A1* | 5/2013 | Holmberg | ............... | G06F 16/50 707/756 |
| 2014/0279961 A1* | 9/2014 | Schreter | ................ | G06F 3/0673 707/693 |
| 2015/0088824 A1* | 3/2015 | Kamp | .................. | G06F 12/1018 707/626 |
| 2016/0103914 A1* | 4/2016 | Im | ........................ | G06F 16/2455 707/770 |
| 2017/0147333 A1* | 5/2017 | Bregler | ..................... | G06F 8/60 |
| 2017/0199875 A1* | 7/2017 | Nevrekar | ............ | G06F 16/9032 |
| 2019/0347209 A1* | 11/2019 | Seifert | .................... | G06F 3/067 |
| 2020/0210398 A1* | 7/2020 | Liu | ...................... | G06F 16/2246 |

* cited by examiner

*Primary Examiner* — Leslie Wong
(74) *Attorney, Agent, or Firm* — Buckley, Maschoff & Talwalkar LLC

(57) ABSTRACT

A database system includes a data server, a disk-based storage system in communication with the data server, a source table including a plurality of columns, where data of the source table is stored in the disk-based storage system in columnar format, a full-text index associated with one of the plurality of columns, and a text analysis result table associated with the one of the plurality of columns, where the data of the text analysis result table is stored in the disk-based storage system in columnar format.

20 Claims, 8 Drawing Sheets

EXTENDED STORAGE OF TEXT ANALYSIS SOURCE TABLES

BACKGROUND

Some database systems use in-memory columnar storage as well as disk-centric columnar storage (i.e., "extended storage"). Data stored in the extended storage is available during runtime for both queries and updates. The extended storage is typically associated lower performance than the in-memory storage (albeit at a lower cost), and therefore may be used to store infrequently-accessed "warm" data. Database tables including columns associated with full-text indexes cannot be stored in extended storage.

Some databases provide text analysis of unstructured text sources. Text analysis may include entity and relationship extraction, pattern detection, document categorization, and identification of domain facts such as sentiments, topics and requests. Thusly-analyzed unstructured data may be combined with structured data, and similarly queried, analyzed, and visualized.

Text analysis of a table column requires a full-text index of the table column. However, a table which is associated with a full-text index cannot be assigned to extended storage. Therefore, a table cannot be stored using extended storage and also subjected to text analysis. What is needed are systems to efficiently support text analysis of a table which is stored within extended disk-centric columnar storage.

BRIEF DESCRIPTION OF THE DRAWINGS

FIG. 5 depicts column metadata of a text analysis source table according to some embodiments.

FIG. 7 depicts column metadata of a text analysis result table according to some embodiments.

DETAILED DESCRIPTION

According to some embodiments, an in-memory columnar database system may store a database table associated with one or more full-text indexes within disk-based columnar storage. Text analysis results tables corresponding to the indexed columns of the database table may also be stored within disk-based columnar storage. Advantageously, such embodiments may efficiently integrate extended disk-based columnar storage and text analysis for a given database table.

In some embodiments, one or more partitions of the database table may be stored in-memory while one or more other partitions of the database table may be stored in disk-based columnar storage. Similarly, one or more partitions of a text analysis results table may be stored in-memory while one or more other partitions of the text analysis results table may be stored in disk-based columnar storage. Some embodiments therefore provide flexibility to dynamically address performance, cost and capacity concerns.

Figure 1:
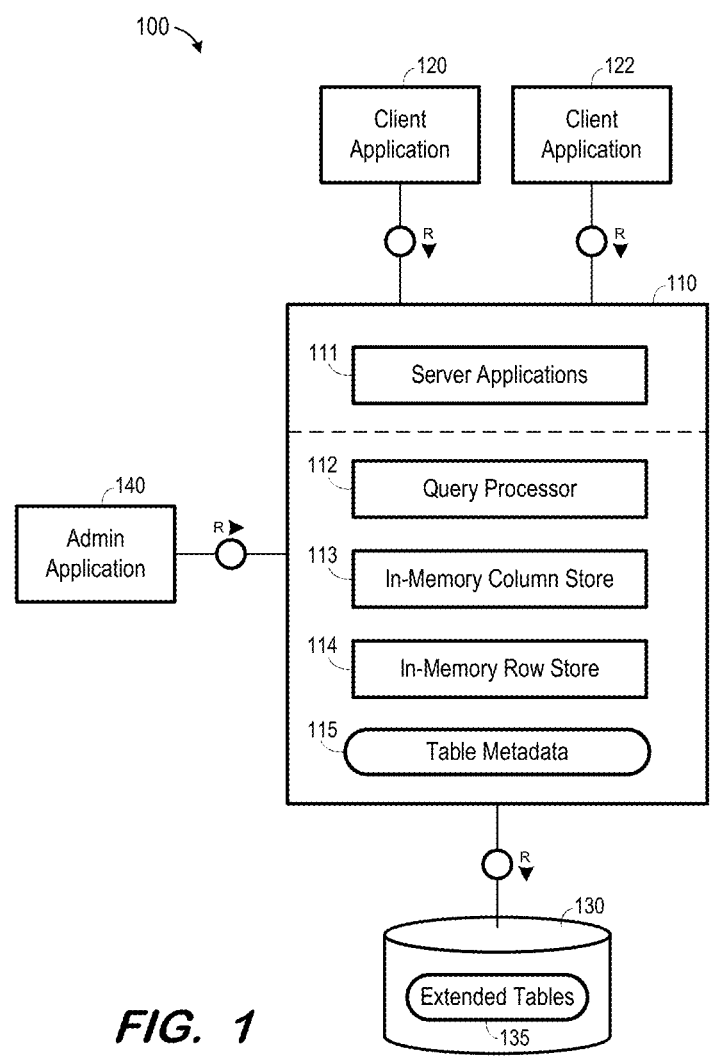
FIG. 1 is a block diagram of a database system according to some embodiments.

FIG. 1 is a block diagram of system 100 according to some embodiments. System 100 includes data server 110, client applications 120 and 122, disk-based storage 130 and administrator application 140. According to some embodiments, data server 110 and storage 130 operate to serve transactional and analytical data to client applications 120 and 122 based on requests received therefrom. System 100 may be implemented using any client-server architecture that is or becomes known, including but not limited to on-premise, cloud-based and hybrid architectures.

Server applications 111 are executed to provide functionality to client applications 120 and 122. Server applications 111 may retrieve data from data server 110 in order to provide such functionality. Server applications 111 are illustrated as executed completely on the database platform of data server 110. In some embodiments, server applications 111 may be executed on a platform which is separate from the remaining elements of data server 110.

Server applications 111 may present queries to query processor 112 in order to create, retrieve, update, or delete data stored in data server 110 and/or storage 130. Query processor 112 may comprise any query-responsive processor that is or becomes known, including but not limited to a structured-query language (SQL) processor.

Data server 110 may implement an "in-memory" database, in which the database tables are primarily stored in volatile (e.g., non-disk-based) memory (e.g., Random Access Memory) and data is accessed therefrom and updated therein. The full database may be persisted in and/or backed up to fixed disks (not shown).

The database tables may be stored in in-memory column store 113, in-memory row store 114, and any other in-memory store that is or becomes known. As is known in the art, in-memory column store 113 (and disk-based column storage 130) may store all values of a first column of a database table in consecutive memory locations, followed by all values of a second column, etc. In contrast, a row store stores all the data of first table row in consecutive locations, followed by all values of a second row, etc.

Due to the consecutive storage of values of a same column, column stores may be more amenable to compression than row stores. In one common implementation, a column store stores a database table column as a compressed column vector of numeric values and a data dictionary associating each numeric value with column data. Moreover, the data of stores 113, 114 and 130 may be indexed and/or selectively replicated in an index to allow fast searching and retrieval thereof.

Data server 110 may comprise a relational database, a multi-dimensional database, an eXtendable Markup Language (XML) document, or any other data storage system storing structured and/or unstructured data. The data of data server 110 may be distributed among several relational databases, dimensional databases, and/or other data sources. Embodiments are not limited to any number or types of data sources.

Data server 110 stores table metadata 115 defining the structure and attributes of the data stored therein. Table metadata 115 may define a database schema including multiple database tables, logical relationships between the multiple tables, columns and column types of each database table, primary and foreign keys of each database table, and any other attributes. According to some embodiments, table metadata 115 may identify a table column which is associated with a full-text index, and may indicate that a table is associated with extended storage. As described herein, a table associated with extended storage is stored, in part or in full, within extended tables 135 of disk-based columnar storage 130.

In order to shield a user from the complexities of the underlying database schema, table metadata 115 may associate intuitively-named logical objects with one or more physical entities (e.g., a physical database table, associated columns of one or more database tables). These objects may be classified as dimensions, along which one may want to perform an analysis or report (e.g., Year, Country, Product), or measures (e.g., Sales, Profit), whose values can be determined for a given combination of dimension members. As a result, data server 110 may efficiently process the query "Sales by Country" received from client application 120 or 122.

In one example of runtime operation, client application 120 presents a user interface to a user. The user interface may be suited for reporting, data analysis, and/or any other functions based on the data of data server 110. The user inputs a query via the user interface, and client application 120 forwards a request based on the query to server 110. One or more of server applications 111 generates a script based on the request and forwards the script to query processor 112. Query processor 112 executes the script to return a result set based on data of column store 113, row store 114 and/or extended tables 135, and client application 120 generates and displays a report/visualization based on the result set. In this regard, extended tables 135 are online and may be subjected to the same operations as data of in-memory column store 113 during operation of data server 110.

Storage 130 may comprise one or more non-volatile data storage units (e.g., fixed disks) storing a relational database, a multi-dimensional database, an eXtendable Markup Language (i.e., XML) document, or any other structured and/or unstructured data. Storage 130 may also store log volumes, data backups, and/or other suitable data. The data of storage 130 may be distributed among several non-volatile data storage units. Embodiments are not limited to any number or types of non-volatile data storage units.

Client applications 120 and 122 may be executed by one or more devices and may comprise program code for presenting user interfaces to allow interaction with data server 110. Presentation of a user interface may comprise any degree or type of rendering, depending on the type of user interface code generated by data server 110. For example, client application 120 may comprise a Web Browser to receive a Web page (e.g., in HTML format) from data server 10, and may render and present the Web page according to known protocols. Client applications 120 and 122 may also or alternatively present user interfaces by executing a stand-alone executable file (e.g., an .exe file) or code (e.g., a JAVA applet) within a virtual machine.

Although embodiments are described with respect to data server 110, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 110 may also or alternatively support multi-tenancy by providing multiple logical database systems which are programmatically isolated from one another.

Figure 2:
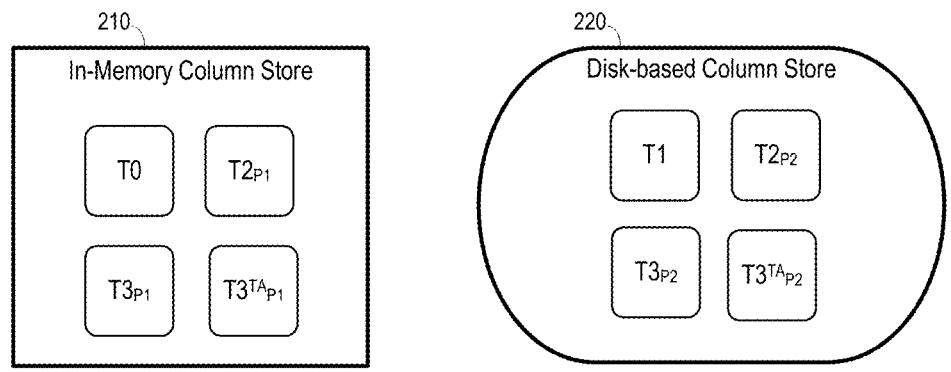
FIG. 2 illustrates tables stored in an in-memory column store and in a disk-based column store according to some embodiments.

FIG. 2 illustrates tables stored in in-memory column store 210 and in disk-based column store 220 according to some embodiments. Each table or table partition is stored in columnar format as is known in the art. Storage of the database tables within in-memory column store 210 and/or disk-based column store 220 is determined by configurations specified in table metadata 115.

According to the example, in-memory column store 210 stores complete table T0 and disk-based column store 220 does not store any portion of table T0. Accordingly, table T0 is considered as non-extended. In contrast, table T1 is stored entirely within disk-based column store 220 and is therefore considered as extended.

Table T2 consists of two partitions. A first partition $T2_{P1}$ is stored in in-memory column store 210 and a second partition $T2_{P2}$ is stored in disk-based column store 220. Table T2 may be considered a multistore-table, and the assignment of its partitions to their respective column stores is specified in table metadata 115. Some embodiments may implement aging rules on table T2 in order to migrate data at specified times or in specified circumstances between higher-performance in-memory column store 210 and lower-cost disk-based column store 220.

At least one column of table T3 is associated with a full-text index and is subjected to text analysis. Advantageously, and according to some embodiments, table T3 consists of a first partition $T3_{P1}$ stored in in-memory column store 210 and a second partition $T3_{P2}$ stored in disk-based column store 220.

Due to its association with a full-text index, table T3 is also associated with text analysis result table $T3^{TA}$. Text analysis result table $T3^{TA}$ consists of a first partition $T3_{P1}$ stored in in-memory column store 210 and a second partition $T3_{P2}$ stored in disk-based column store 220. Embodiments may therefore simultaneously provide extension of a database table into extended disk-based columnar storage and text analysis of one or more columns of the database table.

Figure 3:
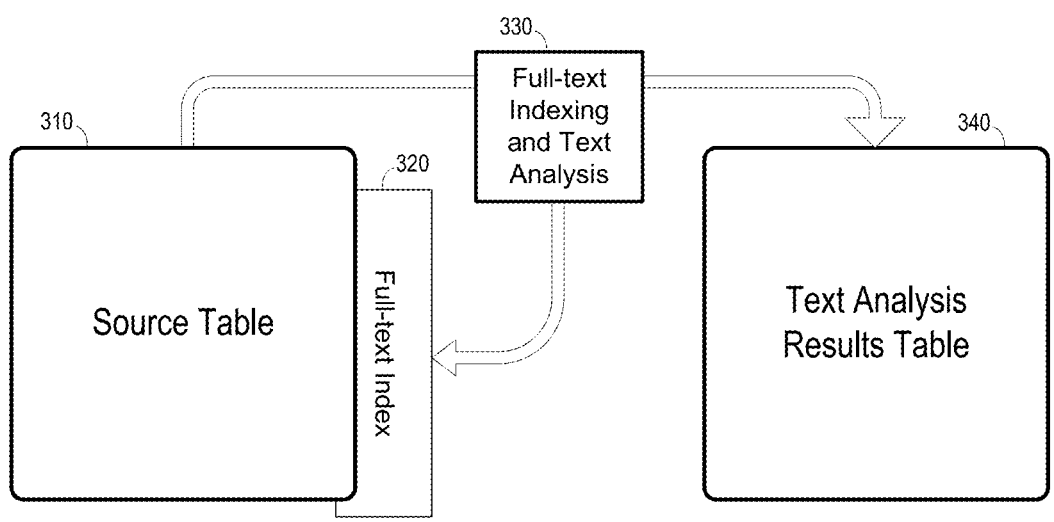
FIG. 3 illustrates full-text indexing and text analysis of a source table according to some embodiments.

FIG. 3 illustrates full-text indexing and text analysis of a table according to some embodiments. Source table 310 includes a plurality of columns (not shown) defined by table metadata 115, for example. Metadata 115 also defines a full-text index 320 on one of the columns.

In operation, data server 110 executes full-text indexing and text analysis processes 330 to generate and maintain full-text index 320 based on a current state of source table 310. Processes 330 generate text analysis results table 340, which specifies entities and relationships, patterns, and domain facts such as sentiments, topics and requests extracted from the column.

Each of source table 310 and text analysis results table 340 may be a multistore table such as tables T3 and $T3^{TA}$. One or both of source table 310 and text analysis results table 340 may be an extended table existing solely within column store 220, such as table T1. Embodiments may therefore provide storage flexibility and text analysis functionality to database tables.

Figure 4:
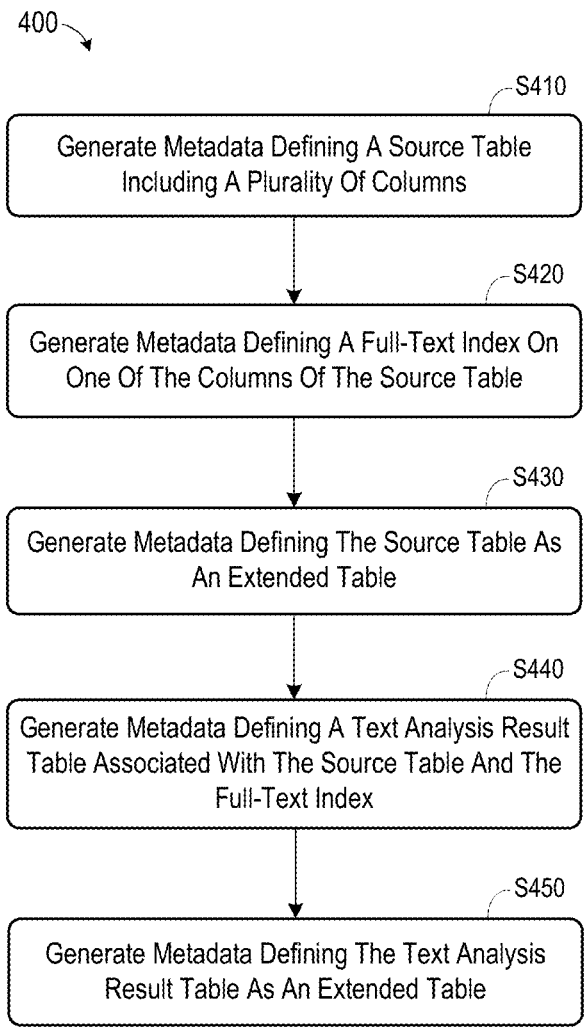
FIG. 4 is a flow diagram of a process to define a text analysis source table as an extended table according to some embodiments.

FIG. 4 comprises a flow diagram of process 400 according to some embodiments. Process 400 may be executed to establish an extended table which is compatible with text analysis.

In some embodiments, various hardware elements of system 100 execute program code to perform process 400. Process 400 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S410, metadata is generated to define a source table including a plurality of columns. In one example, administrator application 140 accesses an administrator interface provided by data server 110. The administrator interface may allow an administrator to create and edit table metadata 115. Accordingly, an administrator may interact with the administrator interface to define tables, table columns, table dependencies, column properties, logical objects, and other entities of a database.

Figure 5:
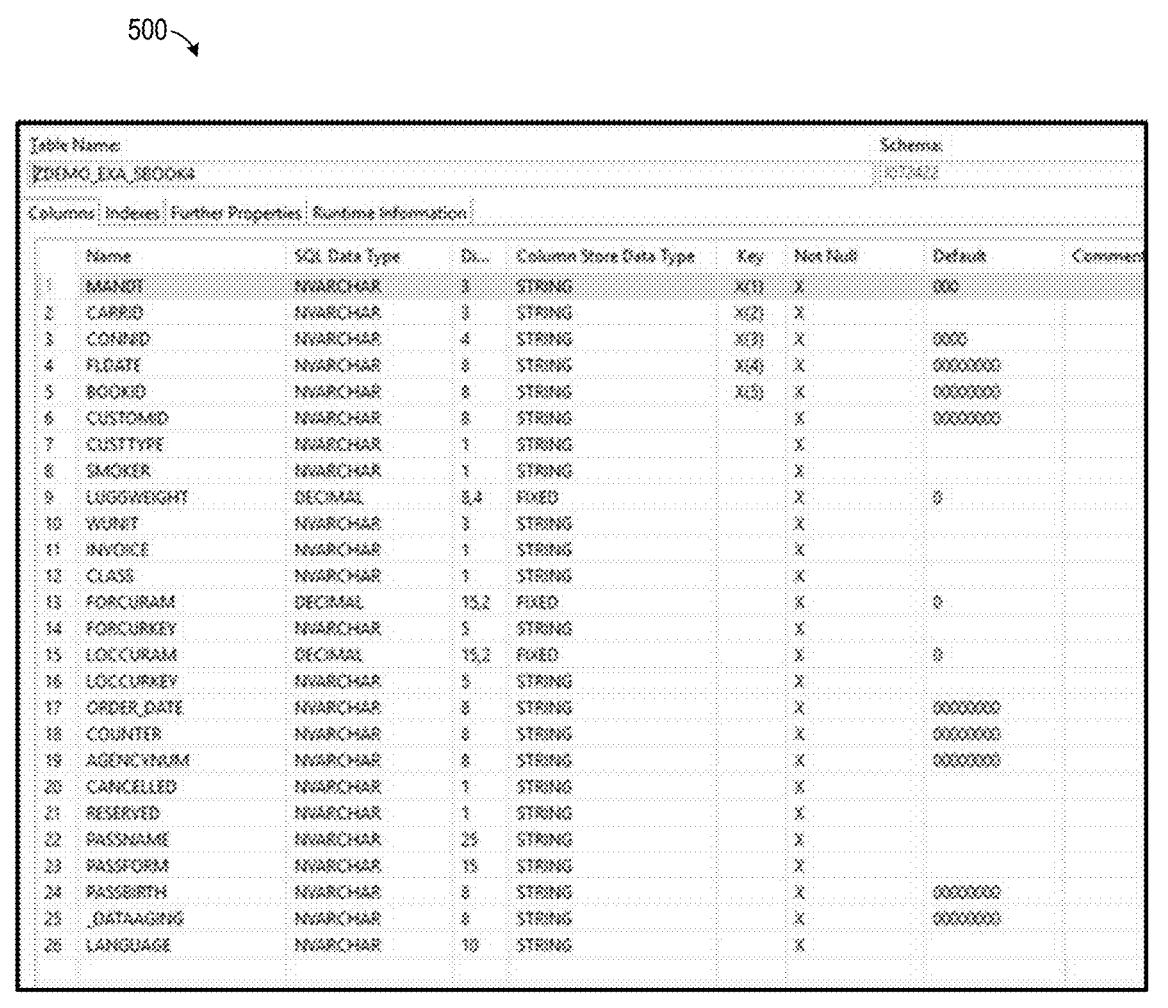

FIG. 5 illustrates user interface 500 showing generated metadata defining a table according to some embodiments. User interface 500 displays a name of the subject table (i.e., "ZDEMO_EXA_SBOOK4") and a schema to which the table belongs (i.e., "IO72422"). The displayed tab (i.e., Columns) of interface 500 shows the names of each column of the table, as well as properties associated with each column.

Figure 6:
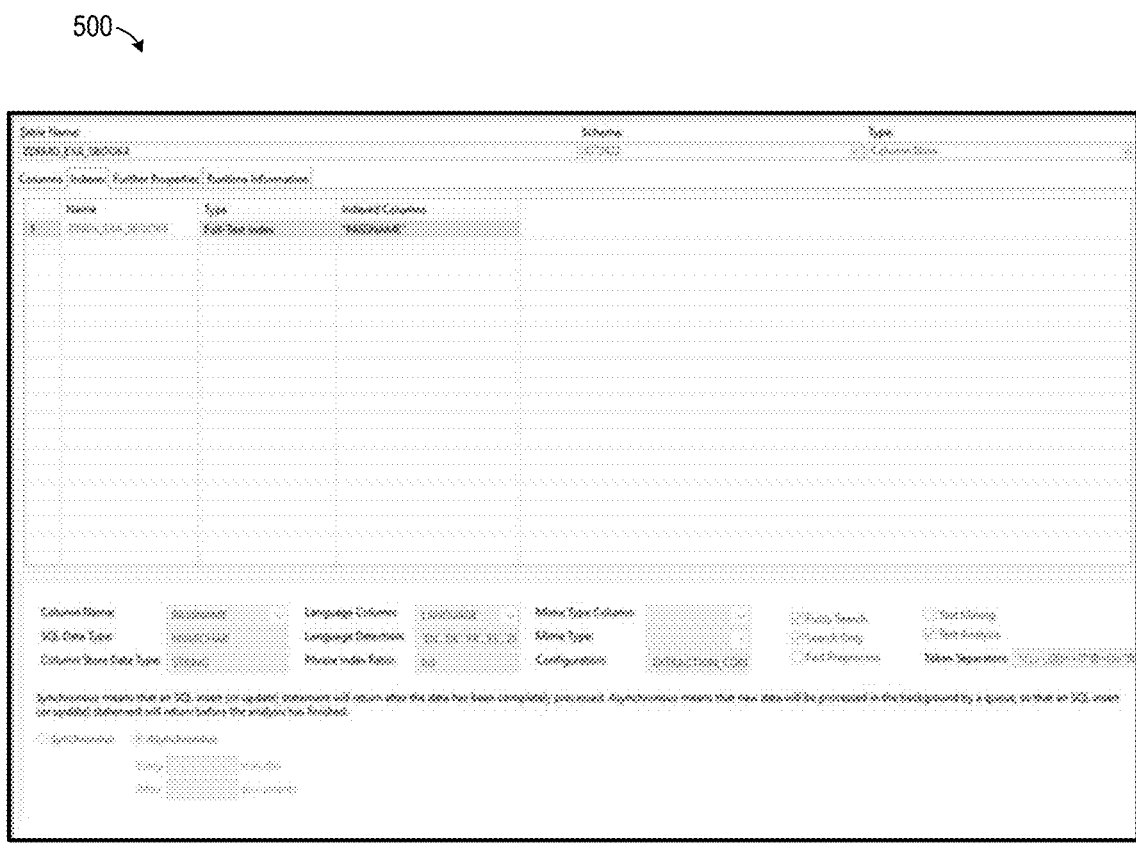
FIG. 6 depicts metadata of a full-text index of a column of a text analysis source table according to some embodiments.

At S420, metadata is generated defining a full-text index on one of the columns of the source table. Continuing the present example, FIG. 6 illustrates user interface 500 in which the Index tab is selected for display. As shown, metadata has been generated defining full-text index ZINDX_EXA_SBOOK4, and associating the full-text index with Column "PASSNAME" of the source table.

Metadata is generated at S430 to define the source table as an extended table. The metadata may be generated at S430 via an administrator user interface such as user interface 500. For example, an administrator may operate administrator application 140 to enter a command such as "alter table "KNAV"."ZDEMO_EXA_SBOOK4" using extended storage. In response to the command, data server 110 generates table metadata 115 indicating that the source table is to be stored among extended tables 135 of storage 130.

Figure 7:
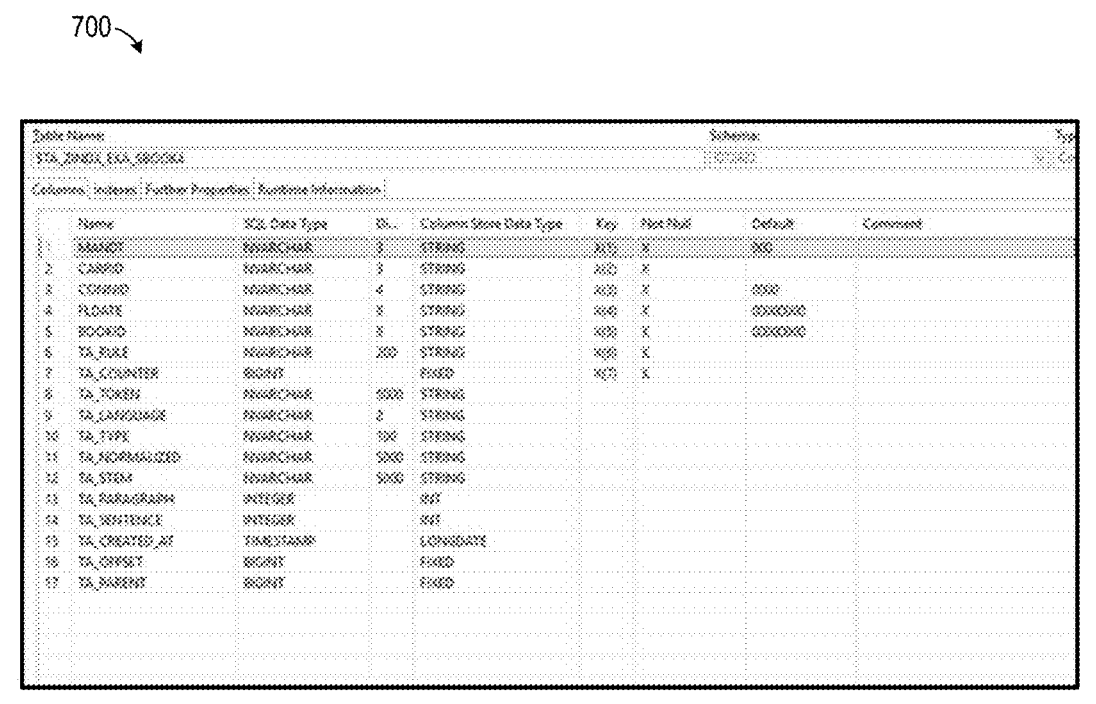

Next, at S440, metadata is generated to define a text analysis result table associated with the source table and the full-text index. FIG. 7 shows administrator user interface 700 displaying metadata of text analysis result table "$TA_ZINDX_EXA_SBOOK4", which corresponds to full-text index ZINDX_EXA_SBOOK4 of source table ZDEMO_EXA_SBOOK4. Similarly to S430, metadata is also generated at S450 defining the text analysis result table as an extended table.

Figure 8:
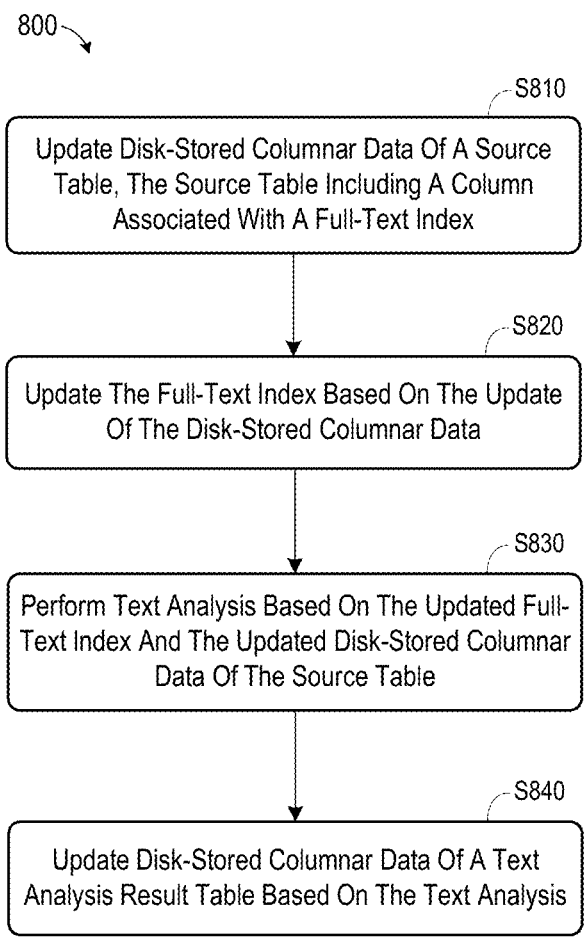
FIG. 8 is a flow diagram of a process to update a text analysis result table based on an extended source table according to some embodiments.

Process 800 of FIG. 8 describes runtime operation of a database system which is defined in metadata as described with respect to process 400. Initially, at S810, disk-stored columnar data of a source table is updated. The source table is fully or partially stored in extended storage, and one of the columns of the source table is associated with a full-text index. The update may be triggered by a create, update or delete database operation.

The full-text index is updated at S820 based on the update of S810. Updating the full-text index utilizes indexing techniques that are or become known.

Text analysis is performed at S830 based on the updated full-text index and on the updated source table. Based on the text analysis, disk-stored columnar data of a text analysis result table is updated at S840. In this regard, the text analysis result table is also fully or partially stored in extended columnar storage.

The data is updated at S840 with structured information resulting from the text analysis. As is known in the art, text analysis may comprise analyzing unstructured information (i.e., the text of the column associated with the full text index), extracting relevant information, and transforming that extracted information into structured information. The structured information may be queried, analyzed, visualized, and combined with other structured information.

Figure 9:
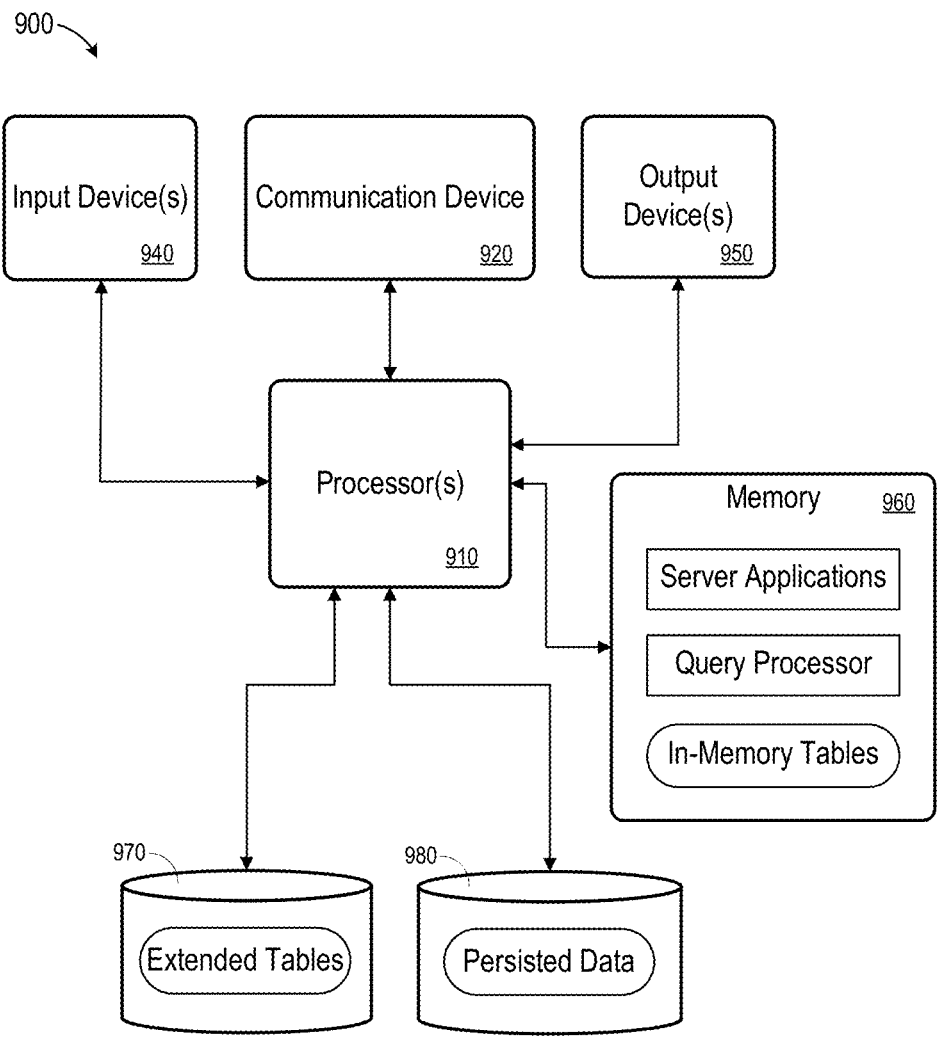
FIG. 9 is a block diagram of a database architecture according to some embodiments.

FIG. 9 is a block diagram of apparatus 900 according to some embodiments. Apparatus 900 may comprise a general-purpose computing apparatus or computing system and may execute program code to perform any of the functions described herein. Apparatus 900 may comprise an implementation of data server 110 in some embodiments. Apparatus 900 may include other unshown elements according to some embodiments.

Apparatus 900 includes processor(s) 910 operatively coupled to communication device 920, one or more input devices 940, one or more output devices 950, memory 960, disk-based storage 970 and persistent storage 980. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen), a speaker, and/or a printer.

Memory 960 may comprise Random Access Memory (RAM) and may store server applications, a query processor and in-memory database tables during operation of system 900. Memory 960 may also store metadata defining the structure, properties and dependencies of the database tables.

Disk-based storage 970 may comprise one or more hard disk drives storing full or partitions of extended tables in columnar format as described above. Persistent storage 980 may comprise any appropriate persistent storage device for storing backups, logs, etc., including combinations of magnetic storage devices (e.g., magnetic tape, hard disk drives and flash memory), optical storage devices, and Read Only Memory (ROM) devices.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
a data server storing table metadata, the table metadata 1. specifies configurations determinative of storing a first partition of a source table in a disk-based column storage system and a second partition of the source table in an in-memory column store; 2. specifies configurations determinative of storing a first partition of a text analysis result table in the disk-based column storage system and a second partition of the text analysis result table in the in-memory column store, and 3. identifies a table column as associated with a full text index;
the disk-based column storage system in communication with the data server;
the source table comprising a plurality of columns, where data of the source table is stored in the disk-based column storage system in columnar format based on the table metadata;
the full-text index associated with one of the plurality of columns; and
the text analysis result table associated with the one of the plurality of columns associated with the full-text index.

2. The database system according to claim 1, the data server comprising a volatile memory storing data of a plurality of database tables.

3. The database system according to claim 1, wherein the data of the source table stored in the disk-based storage system is data of the first partition of the source table, and wherein data of the second partition of the source table is stored in a volatile memory of the data server.

4. The database system according to claim 3, wherein the data of the text analysis result table stored in the disk-based storage system is data of the first partition of the text analysis result table, and wherein data of the second partition of the text analysis result table is stored in a volatile memory of the data server.

5. The database system according to claim 1, wherein the data of the text analysis result table stored in the disk-based storage system is data of the first partition of the text analysis result table, and wherein data of the second partition of the text analysis result table is stored in a volatile memory of the data server.

6. The database system according to claim 1, further comprising:
a second full-text index associated with a second one of the plurality of columns; and
a second text analysis result table associated with the second one of the plurality of columns, where the data of the second text analysis result table is stored in the disk-based storage system in columnar format.

7. The database system according to claim 6, wherein the data of the text analysis result table stored in the disk-based storage system is data of the first partition of the text analysis result table,
wherein data of the second partition of the text analysis result table is stored in a volatile memory of the data server,
wherein the data of the source table stored in the disk-based storage system is data of the first partition of the source table, and
wherein data of the second partition of the source table is stored in a volatile memory of the data server.

8. A computer-implemented method for a database system comprising a plurality of database tables stored in volatile memory, the method comprising:
storing table metadata, wherein the table metadata 1. specifies configurations determinative of storing a first partition of a source table in a disk-based column storage system and a second partition of the source table in volatile memory 2. specifies configurations determinative of storing a first partition of a text analysis result table in the disk-based storage column and a second partition of the text analysis result table in the volatile memory, and 3. identifies a table column as associated with a full text index;
storing data of the source table comprising a plurality of columns in the disk-based column storage system in columnar format based on the table metadata;
storing the full-text index associated with one of the plurality of columns; and
storing data of the text analysis result table associated with the one of the plurality of columns associated with the full-text index.

9. The method according to claim 8, further comprising performing text analysis on the one of the plurality of columns and storing the results of the text analysis in the text analysis result table in the disk-based storage system in columnar format.

10. The method according to claim 8, wherein the data of the source table stored in the disk-based storage system is data of the first partition of the source table, and wherein data of the second partition of the source table is stored in the volatile memory.

11. The method according to claim 10, wherein the data of the text analysis result table stored in the disk-based storage system is data of the first partition of the text analysis result table, and wherein data of the second partition of the text analysis result table is stored in the volatile memory.

12. The method according to claim 8, wherein the data of the text analysis result table stored in the disk-based storage system is data of the first partition of the text analysis result table, and wherein data of the second partition of the text analysis result table is stored in the volatile memory.

13. The method according to claim 8, further comprising:
storing a second full-text index associated with a second one of the plurality of columns; and
storing online data of a second text analysis result table associated with the second one of the plurality of columns in the disk-based storage system in columnar format.

14. The method according to claim 13, wherein the data of the text analysis result table stored in the disk-based storage system is data of the first partition of the text analysis result table,
wherein data of the second partition of the text analysis result table is stored in the volatile memory,
wherein the data of the source table stored in the disk-based storage system is data of the first partition of the source table, and
wherein data of the second partition of the source table is stored in the volatile memory.

15. A database system comprising:
a volatile random access memory storing a plurality of database tables and metadata defining a source table comprising a plurality of columns and defining a full-text index of one of the plurality of columns and the metadata 1. specifying configurations determinative of storing a first partition of the source table in a disk-based column storage system and a second partition of the source table in the volatile random access memory, and 2. specifying configurations determinative of storing a first partition of a text analysis result table in the disk-based column storage system and a second partition of the text analysis result table in the volatile random access memory;
a disk-based storage system; and
a processor to:
store data of the source table in the disk-based storage system in columnar format data based on the metadata; and
store data of the text analysis result table associated with the one of the plurality of columns associated with the full-text index.

16. The system according to claim 15, the processor further to perform text analysis on the one of the plurality of columns and store the results of the text analysis in the text analysis result table in the disk-based storage system in columnar format.

17. The system according to claim 15, wherein the data of the source table stored in the disk-based storage system is data of a first partition of the source table, and wherein data of the second partition of the source table is stored in the volatile random access memory.

18. The system according to claim 17, wherein the data of the text analysis result table stored in the disk-based storage system is data of the first partition of the text analysis result table, and wherein data of the second partition of the text analysis result table is stored in the volatile random access memory.

19. The system according to claim 15, wherein the data of the text analysis result table stored in the disk-based storage system is data of first partition of the text analysis result table, and wherein data of the second partition of the text analysis result table is stored in the volatile random access memory.

20. The system according to claim 15, the metadata defining a second full-text index associated with a second one of the plurality of columns, and the processor further to:
store data of a second text analysis result table associated with the second one of the plurality of columns in the disk-based storage system in columnar format.

* * * * *